United States Patent [19]

Wood et al.

[11] Patent Number: 5,292,864
[45] Date of Patent: Mar. 8, 1994

[54] DECOLORIZING POLYASPARTIC ACID POLYMERS

[75] Inventors: Louis L. Wood, Rockville; Gary J. Calton, Elkridge, both of Md.

[73] Assignee: SRCHEM Incorporated, Elkridge, Md.

[21] Appl. No.: 44,902

[22] Filed: Apr. 7, 1993

Related U.S. Application Data

[63] Continuation-in-part of Ser. No. 926,243, Aug. 7, 1992, abandoned.

[51] Int. Cl.$^5$ ............................................. C08G 69/10
[52] U.S. Cl. .................................. 528/490; 525/420; 528/322; 528/328; 528/483
[58] Field of Search ............... 528/490, 483, 322, 328; 525/420

[56] References Cited

U.S. PATENT DOCUMENTS

| | | | |
|---|---|---|---|
| 4,363,797 | 12/1982 | Jacquet et al. | 424/70 |
| 5,057,597 | 10/1991 | Koskan | 528/328 |
| 5,152,902 | 10/1992 | Koskan et al. | 210/698 |

OTHER PUBLICATIONS

Stinson, S. Polyaspartic acid process developed. Chemical and Engineering News, Jul. 20, 1992, p. 21.
Harada, K. and Fox, S. W. Thermal polycondensation of free amino acids with polyphosphoric acid. Chemical Abstracts, vol. 63, 1965 685e.

*Primary Examiner*—Harold D. Anderson
*Attorney, Agent, or Firm*—William S. Ramsey

[57] ABSTRACT

Solutions of polymers of aspartic acid or its amine copolymers prepared by thermal condensation are reacted with a decolorizing agent selected from the group consisting of hypochlorfte, chlorine, chlorine dioxide, hydrogen peroxide, a peroxycarboxylate or ozone, sufficient in strength to effect the desired decolorization.

14 Claims, No Drawings

DECOLORIZING POLYASPARTIC ACID POLYMERS

This application is a continuation-in-part of application Ser. No. 07/926,243, filed Aug. 7, 1992, now abandoned.

FIELD OF THE INVENTION

This invention relates to methods for the reduction of color obtained in the thermal polymerize on of aspartic acid or the ammonium salts of maleic acid or fumaric acid to produce polysuccinimide which is then hydrolyzed to obtain polyaspartic acid or of copolymers of aspartic acid obtained by the thermal polymerization of these materials with polyamines.

DESCRIPTION OF RELATED ART

Sodium polyaspartate and copolymers of polyaspartate find application as adjuvants in cosmetics and in hair-treatment compositions such as shampoos, hair wave setting lotion or hair brushing lotion. Preparation of such polymers, however, is associated with the generation of highly colored products which interfere with cosmetic and hair treatment applications.

Previous methods for the reduction of color in the thermal polymerization to obtain less colored polyaspartic acid from its precursor compounds have centered on the reaction conditions and catalysts used in the thermal polymerization.

In U.S. Pat. No. 4,363,797, a superior method of forming reduced color polysuccinimide is disclosed in which the polymerization is carried out in the presence of a solvent of high boiling point in conjunction with a solid acid catalyst, yielding a polysuccinimide which is only slightly colored. Also disclosed is the use of 85% ortho-phosphoric acid as a catalyst for the production of a white polysuccinimide; however, the use of this reagent is said to require unusual apparatus, delicate separation and large volumes of solvent. Polysuccinimide may be converted to polyaspartic acid by treatment with hydroxide.

U.S. Pat. No. 5,057,597 discloses the thermal condensation of aspartic acid in a nitrogen atmosphere to form polysuccinimide which may then be hydrolyzed to give polyaspartic acid. No decolorization is disclosed.

These disclosures do not meet the requirement of an inexpensive, effective environmentally benign process for the decolorization of polyaspartate and its amine copolymers.

SUMMARY OF THE INVENTION

A method for decolorizing polyaspartic acid prepared by thermal condensation is disclosed wherein a solution of polyaspartic acid is reacted with a decolorizing agent selected from the group consisting of hypochlorite, chlorine dioxide, ozone, hydrogen peroxide, a peroxydicarbonate or chlorine sufficient in strength to effect the desired decolorization.

One objective of this invention is to provide processes for decolorization of polyaspartate and its amine copolymers.

Another objective is to provide processes which produce polyaspartate and its amine copolymers having reduced color which is suitable for cosmetic and hair-treatment applications.

A final objective is to provide processes for decolorizing polyaspartate and ks amine copolymers which are inexpensive, effective, safe and without adverse environmental effects.

DETAILED DESCRIPTION OF THE EMBODIMENTS.

Polyaspartate may be formed by the thermal polymerization of L-aspartic acid followed by the alkaline hydrolysis of the resulting polysuccinimide. Another approach is through alkaline hydrolysis of polysuccinimide which has been formed by the thermal polymerization of ammonium maleate or ammonium fumarate. Amine copolymers of polyaspartate may be formed by copolymerization of ammonium maleate with polyamines as disclosed in U.S. Pat. Applic. "Copolymers of Polyaspartic Acid," Louis L. Wood, filed herewith and incorporated herein by reference.

Preparations of polyaspartate and of amine copolymers may be decolorized by treating water solutions of the polymers with a sodium hypochlorite, hydrogen peroxide, peroxydicarbonate, chlorine dioxide, chlorine, or ozone.

The above treatments as well as their effects on the polymer's activity in inhibiting calcium carbonate precipitation and their polymer molecular weights are described in Examples 1-9. Examples 10 and 11 show the failure of treatment with hydrogen or sodium formaldehyde sulfoxylate to decolorize.

Treatment with sodium hypochlorite, hydrogen peroxide, a peroxydicarbonate, or chlorine dioxide were without effect on the calcium carbonate precipitation inhibition properties of the polymers. Such treatments also did not effect the molecular weights of the polymers.

Treatment with sodium hypochlorite peroxide, a peroxydicarbonate, hydrogen peroxide, chlorine dioxide, chlorine, or ozone had the unexpected effects of effectively decolorizing the polymers without adversely effecting the properties of inhibiting calcium carbonate precipitation in the calcium carbonate drift assay as well a having no effect or the molecular weight of the polymers.

EXAMPLE 1

The use of hypochlorite to decolorize an amine copolymer of polyaspartate

To 2.5 ml of a 30% water solution of a triamine copolymer with sodium polyaspartate, pH 10, prepared by the thermal polymerization of ammonium maleate with JEFFAMINE T403 at 240°-250° C. for 45 minutes, was added 0.5 ml of a 5.25% solution of sodium hypochlorite. The color changed f/om an intense reddishbrown to a straw colored liquid. JEFFAMINE is a trademark of Texaco Chemical Co. for its amines.

Both treated and untreated sodium polyaspartate were tested for inhibition of calcium carbonate precipitation by the calcium draft assay. In this assay a supersaturated solution of calcium carbonate is formed by adding 0.3 ml of a sodium carbonate solution (0.25 M $NaHCO_3$+0.25 M $NP_2CO_3$) to 29.1 ml of 0.55 M NaCl and 0.01 M KCI containing 0.15 ml of 1.0 M CACU and 1.7 ppm of the material to be tested. The reaction was initiated by adjusting the pH to 7.5-8.0 by titration with 1 N NAOH and addition of the material to be tested for inhibition of $CaCo_3$ precipitation at a level of 1.7 ppm. At three minutes, 10 mg of $CACO_3$ was added and the pH was recorded. The decrease in pH is directly correlated to the amount of $CaCO_3$ that precipitates. The effect in the calcium carbonate drift assay was not diminished by this decolorization treatment.

Molecular weight determination was made by chromatography on a 1 cm X 18 cm, Sephadex G-50 column in a mobile phase of 0.02 M sodium phosphate buffer, pH 7.0, running at 0.5 ml/min, with detection in the UV at 240 nm. The molecular weight of the polyaspartate was unchanged by decolorization.

EXAMPLE 2

The use chlorite to decolorize polyaspartate prepared from L-aspartic acid

To 2.5 ml of a 30% water solution of sodium polyaspartate, pH 10, prepared by the thermal polymerization of L-aspartic acid at 220°-250° C. for 45 minutes, was added 0.5 ml of a 5.25% solution of sodium hypochlorfte. The color changed from a light tan to a straw colored liquid.

When assayed for its effect in the calcium carbonate drift assay and for molecular weight by the procedures of Example 1, the effect in the calcium carbonate drift assay was not diminished by this decolorization treatment and the molecular weight was unchanged by decolorization.

EXAMPLE 3

The use of chlorine to decolorize polyaspartate prepared from ammonium maleate

A 33% water solution of sodium polyaspartate, 100 g, pH 10, prepared by the thermal polymerization of ammonium maleate at 240°-250° C., for 45 minutes, was purged with a light stream of chlorine gas for 8 minutes. The color change-from an intense reddish-brown to a lemon yellow colored liquid. The pH of the decolorized solution was lowered to pH 4.

When assayed for molecular weight by the procedures of Example 1, the molecular weight was lowered by decolorizxation. After 24 hours, the decolorization was found to be transient.

EXAMPLE 4

The use of chlorine to decolorize polyaspartate prepared from L-aspartic acid

A 30% water solution of sodium polyaspartate, 2 ml, pH 7, prepared by the thermal polymerization of L-aspartic acid at 240°-246° C., for 45 minutes, was purged with a light stream of chlorine gas for 30 seconds. The color changed from an dark orange to a pale yellow liquid. The pH of the decolorized solution was lowered to pH 4.

When assayed for molecular weight by the procedures of Example 1, the molecular weight was lowered by decolorization. After 24 hours, the decolorization was found to be transient.

EXAMPLE 5

Use of ozone to decolorize an amine copolymer of polyaspartate

A 33% water solution of an amine copolymer of sodium polyaspartate, 20 g, pH 10, prepared by the thermal polymerization of ammonium maleate with JEFFAMINE T403, at 240°-250° C., for 45 minutes, was diluted with 20 g of water and a stream of ozone was bubbled through the mixture for 30 min. The color of the liquid reddish-brown to a light yellow.

EXAMPLE 6

Use of chlorine dioxide to decolorize polyaspartate prepared from ammonium maleate To 4.0 g of a 30% solution of sodium polyaspartate, pH 10, prepared by the thermal polymerization of ammonium maleate at 240°-250° C., for 45 minutes, was adjusted to pH 3.0 with concentrated HCl followed by 300 mg of stabilized 5% chlorine dioxide in water. After stirring several minutes at 25° C., the solution changed from dark brown to yellow.

EXAMPLE 7

The use of hydrogen peroxide to decolorize polyaspartate

To 5.0 g of a 30% water solution of sodium polyaspartate, pH 10, prepared by the thermal polymerization of diammonium maleate at 220°-250° C., for 45 minutes, was added 0. 1 g sodium peroxydicarbonate (0.0006 moles). The color changed from a dark red brown to a yellow colored liquid after 1 hour at 55° C. with stirring. An identical solution stirred 10 hours at 26° C. had the same The experiment was repeated with 0.2 g of sodium peroxydicarbonate gave a lighter shade of solution than the 0.1 g experiment.

The experiment was repeated with 1.0 g of 3% hydrogen peroxide (.0009 moles) and the same shade of yellow was obtained as in the first experiment.

When assayed for fits effect in the calcium carbonate drift assay and for molecular weight by the procedures of Example 1, the effect in the calcium carbonate drift assay was not diminished by this decolorization treatment and the molecular weight was unchanged by decolorization.

EXAMPLE 8

The use of hydrogen peroxide to decolorize an amine copolymer of polyaspartate

To 25.0 g of a 30% water solution of an amine copolymer of sodium polyaspartate, pH 10, prepared by the thermal polymerization of diammonium maleate with 1,6-hexanediamine, at 235°-250° C., for 45 minutes, was added 1 g sodium peroxydicarbonate (0.0006 moles). The color changed from a dark red brown to a light yellow colored liquid after 1 hour at 55° C. with stirring.

EXAMPLE 9

The use of sodium borohydride to decolorize polyaspartate

To 5.0 g of a 30% water solution of sodium polyaspartate, pH 10, prepared by the thermal polymerization of diammonium maleate at 220°-250° C., for 45 minutes, was added 0.05 g sodium borohydride. The color changed from a dark red brown to a yellow colored liquid after 1 hour at 56° C. with stirring.

When assayed for molecular weight by the procedures of Example 1, the molecular weight was unchanged by decolorization.

EXAMPLE 10

Failure of sodium formaldehyde sulfoxylate to decolorize polyaspartate

To 5.0 g of a 30% water solution of sodium polyaspartate, pH 10, prepared by the thermal polymerization of diammonium maleate at 220°-250° C., for 45 minutes, was added 0.1 g sodium formaldehyde sulfoxylate. The color changed from a dark red-brown to a red-orange colored liquid after 1 hour at 55° C. with stirring.

EXAMPLE 11

Failure of hydrogen to decolorize polyaspartate prepared from ammonium maleate

A 33% water solution of sodium polyaspartate, 70 g, pH 10, prepared by the thermal polymerization of ammonium maleate at 240°-250° C., for 45 minutes, was placed in a hydrogenation apparatus with 0.5 g of 10% palladium on charcoal find the air above the sample was replaced with hydrogen. The bottle was then shaken for 24 hours. Following removal of the hydrogen gas, the contents of the bottle were centrifuged at high speed to separate the viscous liquid from the palladium on charcoal. No change in the intense reddish-brown color of the liquid was obtained.

EXAMPLE 12

Decolorizing acid catalyzed, thermally polymerized, polyaspartic acid with peroxides A 133 g portion (1.0 moles) of L-aspartic acid was slurried in 125 g of water containing 25 g of 85% $H_3PO_4$ was tumbles at 150°-210° C. for 5 hrs to give 118.8 g of light tan polysuccinimide. The product was washed twice with 200 ml portions of water. A 3.8 g portion of the polysuccinimide was dissolved in 1.6 g NaOH in 8.4 g of water to five a clear red-orange solution of sodium polyaspartate. To this solution was added with good mixing, 0.55 g of 30% $H_2O_2$ in water. After standing 12 hrs at 25° C., the solution was nearly colorless.

EXAMPLE 13

Decolorizing thermally polymerized polyaspartic acid with peroxides

A 133 g portion (1.0 moles) of L-aspartic was tumbled at 285° C. for 2 hrs to give 96.7 g of tan polysuccinimide. A 3.8 g portion of the polysuccinimide was dissolved in 1.6 g NaOH in 8.4 g of water to give a clear, dark brown solution of sodium polyaspartate. To this solution was added with good mixing, 0.55 g of 3% $H_2O_2$ in water. After standing 12 hrs at 25° C., the solution was light yellow in color.

EXAMPLE 14

Decolorizing thermally polymerized polyaspartic acid with peroxide salts

A sample so sodium polyaspartate of the same size and preparation as in Example 13 was treated with 0.75 g of sodium peroxydicarbonate to give a light orange colored solution.

It will be apparent to those skilled in the art that the examples and embodiments described herein are by way of illustration and not of limitation, and that other examples may be utilized without departing from the spirit and scope of the present invention, as set forth in the appended claims.

We claim:

1. A method for decolorizing polymers of aspartic acid prepared by thermal condensation comprising reacting a water solution of the polymer with a decolorizing agent selected from the group consisting of hypochlorite, chlorine, chlorine dioxide, hydrogen peroxide, a peroxydicarbonate or ozone.

2. The method of claim 1 in which the decolorizing agent is hypochlorite.

3. The method of claim 1 in which the decolorizing agent is chlorine.

4. The method of claim 1 in which the decolorizing agent is ozone.

5. The method of claim 1 in which the decolorizing agent is chlorine dioxide.

6. The method of claim 1 in which the decolorizing agent is hydrogen peroxide.

7. The method of claim 1 in which the decolorizing agent is peroxydicarbonate.

8. A method for decolorizing amine copolymers of aspartic acid prepared by thermal condensation comprising reacting a water solution of the copolymer with a decor selected from the group consisting of hypochlorite, chlorine dioxide, hydrogen peroxide peroxydicarbonate or ozone.

9. The method of claim 8 in which the decolorizing agent is hypochlorite.

10. The method of claim 8 in which the decolorizing agent is chlorine.

11. The method of claim 8 in which the decolorizing agent is ozone.

12. The method of claim 8 in which the decolorizing agent is chlorine dioxide.

13. The method of claim 8 in which the decolorizing agent is hydrogen peroxide.

14. The method of claim 8 in which the decolorizing agent is a peroxydicarbonate.

* * * * *

UNITED STATES PATENT AND TRADEMARK OFFICE
CERTIFICATE OF CORRECTION

PATENT NO.   : 5,292,864
DATED        : March 8, 1994
INVENTOR(S)  : Wood et al.

It is certified that error appears in the above-identified that said Letters Patent is hereby corrected as shown below:

Column 6, line 37, "decor" should read --decolorizing agent--.

Signed and Sealed this

Twenty-eight Day of March, 1995

Attest:

BRUCE LEHMAN

Attesting Officer

Commissioner of Patents and Trademarks